United States Patent
Betker

(10) Patent No.: US 7,564,789 B2
(45) Date of Patent: Jul. 21, 2009

(54) METHOD AND SYSTEM FOR REDUCING DEADLOCK IN FIBRE CHANNEL FABRICS USING VIRTUAL LANES

(75) Inventor: Steven M. Betker, Shore View, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 899 days.

(21) Appl. No.: 10/798,468

(22) Filed: Mar. 11, 2004

(65) Prior Publication Data

US 2005/0174942 A1    Aug. 11, 2005

Related U.S. Application Data

(60) Provisional application No. 60/542,241, filed on Feb. 5, 2004.

(51) Int. Cl.
  *H04J 3/14* (2006.01)
(52) U.S. Cl. .................................................. 370/235
(58) Field of Classification Search ................ 370/235, 370/412
See application file for complete search history.

(56) References Cited

U.S. PATENT DOCUMENTS

| | | | |
|---|---|---|---|
| 4,081,612 A | 3/1978 | Hafner | |
| 4,162,375 A | 7/1979 | Schilichte | ................... 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | ................... 370/58 |
| 4,546,468 A | 10/1985 | Christmas et al. | ............ 370/54 |
| 4,569,043 A | 2/1986 | Simmons et al. | ............. 370/63 |
| 4,691,296 A | 9/1987 | Struger | |
| 4,716,561 A | 12/1987 | Angell et al. | |
| 4,725,835 A | 2/1988 | Schreiner et al. | ....... 340/825.83 |

(Continued)

FOREIGN PATENT DOCUMENTS

EP         0649098         9/1994

(Continued)

OTHER PUBLICATIONS

Clark, Tom, "Zoning for Fibre Channel Fabrics", Vixel Corporation Paper—XP002185194., (Aug. 1999), pp. 1-6.

(Continued)

*Primary Examiner*—Kevin C Harper
(74) *Attorney, Agent, or Firm*—Klein, O'Neill & Singh, LLP

(57) ABSTRACT

A method and system for processing fibre channel frames is provided. The method includes, assigning a virtual lane for a frame based on a hop count for the frame; determining if the assigned virtual lane has available credit; and transmitting the frame if credit is available. The system includes, a fibre channel fabric switch element including a receive port for receiving fibre channel frames, which includes a look up table to assign a virtual lane based on a hop count of the frame; and a transmit port that receives a primitive with the assigned virtual lane by the receive port and the transmit port includes a credit control module that determines if an assigned virtual lane can transmit a frame based on available credit.

27 Claims, 10 Drawing Sheets

U.S. PATENT DOCUMENTS

| | | | |
|---|---|---|---|
| 4,821,034 A | 4/1989 | Anderson et al. ............ 340/825 |
| 4,860,193 A | 8/1989 | Bentley et al. |
| 4,964,119 A | 10/1990 | Endo et al. |
| 4,980,857 A | 12/1990 | Walter et al. |
| 5,025,370 A | 6/1991 | Koegel et al. |
| 5,051,742 A | 9/1991 | Hullett et al. |
| 5,090,011 A | 2/1992 | Fukuta et al. |
| 5,115,430 A | 5/1992 | Hahne et al. |
| 5,144,622 A | 9/1992 | Takiyasu et al. ......... 370/85.13 |
| 5,258,751 A | 11/1993 | DeLuca et al. |
| 5,260,933 A | 11/1993 | Rouse |
| 5,260,935 A | 11/1993 | Turner |
| 5,280,483 A | 1/1994 | Kamoi et al. |
| 5,291,481 A | 3/1994 | Doshi et al. |
| 5,339,311 A | 8/1994 | Turner |
| 5,367,520 A | 11/1994 | Cordell ........................ 370/60 |
| 5,390,173 A | 2/1995 | Spinney et al. |
| 5,425,022 A | 6/1995 | Clark et al. |
| 5,537,400 A | 7/1996 | Diaz et al. |
| 5,568,165 A | 10/1996 | Kimura |
| 5,568,167 A | 10/1996 | Galbi et al. |
| 5,579,443 A | 11/1996 | Tatematsu et al. |
| 5,590,125 A | 12/1996 | Acampora et al. |
| 5,594,672 A | 1/1997 | Hicks |
| 5,598,541 A | 1/1997 | Malladi ........................ 395/286 |
| 5,610,745 A | 3/1997 | Bennett ........................ 359/139 |
| 5,666,483 A | 9/1997 | McClary |
| 5,677,909 A | 10/1997 | Heide |
| 5,687,172 A | 11/1997 | Cloonan et al. .............. 370/395 |
| 5,732,206 A | 3/1998 | Mendel |
| 5,748,612 A * | 5/1998 | Stoevhase et al. ............ 370/230 |
| 5,757,771 A | 5/1998 | Li et al. |
| 5,764,927 A | 6/1998 | Murphy et al. |
| 5,768,271 A | 6/1998 | Seid et al. |
| 5,768,533 A | 6/1998 | Ran |
| 5,784,358 A | 7/1998 | Smith et al. |
| 5,790,545 A | 8/1998 | Holt et al. |
| 5,790,840 A | 8/1998 | Bulka et al. |
| 5,818,842 A | 10/1998 | Burwell et al. .............. 370/397 |
| 5,821,875 A | 10/1998 | Lee et al. |
| 5,822,300 A | 10/1998 | Johnson et al. |
| 5,825,748 A | 10/1998 | Barkey et al. |
| 5,828,475 A | 10/1998 | Bennett et al. |
| 5,835,748 A | 11/1998 | Orenstein et al. |
| 5,835,752 A | 11/1998 | Chiang et al. |
| 5,850,386 A | 12/1998 | Anderson et al. |
| 5,892,604 A | 4/1999 | Yamanaka et al. |
| 5,894,560 A | 4/1999 | Carmichael et al. |
| 5,925,119 A | 7/1999 | Maroney |
| 5,936,442 A | 8/1999 | Liu et al. |
| 5,954,796 A | 9/1999 | McCarty et al. |
| 5,974,547 A | 10/1999 | Klimenko |
| 5,978,379 A | 11/1999 | Chan et al. |
| 5,987,028 A | 11/1999 | Yang et al. ................... 370/380 |
| 5,999,528 A | 12/1999 | Chow et al. ................... 370/365 |
| 6,009,226 A | 12/1999 | Tsuji et al. |
| 6,011,779 A | 1/2000 | Wills |
| 6,014,383 A | 1/2000 | McCarty ...................... 370/453 |
| 6,021,128 A | 2/2000 | Hosoya et al. ............... 370/380 |
| 6,031,842 A | 2/2000 | Trevitt et al. |
| 6,046,979 A | 4/2000 | Bauman |
| 6,047,323 A | 4/2000 | Krause ........................ 709/227 |
| 6,061,360 A | 5/2000 | Miller et al. |
| 6,081,512 A | 6/2000 | Muller et al. ................ 370/256 |
| 6,108,738 A | 8/2000 | Chambers et al. |
| 6,108,778 A | 8/2000 | LaBerge |
| 6,118,776 A | 9/2000 | Berman |
| 6,118,791 A | 9/2000 | Fichou et al. |
| 6,128,292 A | 10/2000 | Kim et al. .................... 370/356 |
| 6,131,123 A | 10/2000 | Hurst et al. |
| 6,134,127 A | 10/2000 | Kirchberg |
| 6,144,668 A | 11/2000 | Bass et al. |
| 6,147,976 A | 11/2000 | Shand et al. |
| 6,151,644 A | 11/2000 | Wu |
| 6,158,014 A | 12/2000 | Henson |
| 6,160,813 A | 12/2000 | Banks et al. .................. 370/422 |
| 6,185,203 B1 | 2/2001 | Berman |
| 6,201,787 B1 | 3/2001 | Baldwin et al. |
| 6,209,089 B1 | 3/2001 | Selitrennikoff et al. |
| 6,229,822 B1 | 5/2001 | Chow et al. |
| 6,230,276 B1 | 5/2001 | Hayden |
| 6,240,096 B1 | 5/2001 | Book |
| 6,252,891 B1 | 6/2001 | Perches |
| 6,253,267 B1 | 6/2001 | Kim et al. |
| 6,278,708 B1 | 8/2001 | Von Hammerstein et al. |
| 6,286,011 B1 | 9/2001 | Velamuri et al. |
| 6,289,002 B1 | 9/2001 | Henson et al. |
| 6,301,612 B1 | 10/2001 | Selitrennikoff et al. |
| 6,307,857 B1 | 10/2001 | Yokoyama et al. |
| 6,308,220 B1 | 10/2001 | Mathur ........................ 709/238 |
| 6,311,204 B1 | 10/2001 | Mills et al. |
| 6,324,181 B1 | 11/2001 | Wong et al. .................. 370/403 |
| 6,330,236 B1 | 12/2001 | Ofek et al. .................... 370/369 |
| 6,333,932 B1 | 12/2001 | Kobayasi et al. |
| 6,335,935 B2 | 1/2002 | Kadambi et al. |
| 6,343,324 B1 | 1/2002 | Hubis et al. |
| 6,353,612 B1 | 3/2002 | Zhu et al. |
| 6,370,605 B1 | 4/2002 | Chong |
| 6,397,360 B1 | 5/2002 | Bruns |
| 6,401,128 B1 | 6/2002 | Stai et al. |
| 6,404,749 B1 | 6/2002 | Falk |
| 6,411,599 B1 | 6/2002 | Blanc et al. .................. 370/219 |
| 6,411,627 B1 | 6/2002 | Hullett et al. |
| 6,418,477 B1 | 7/2002 | Verma |
| 6,421,342 B1 | 7/2002 | Schwartz et al. |
| 6,421,711 B1 | 7/2002 | Blumenau et al. |
| 6,424,658 B1 | 7/2002 | Mathur ........................ 370/429 |
| 6,438,628 B1 | 8/2002 | Messerly et al. |
| 6,449,274 B1 | 9/2002 | Holden et al. ................ 370/392 |
| 6,452,915 B1 | 9/2002 | Jorgensen |
| 6,457,090 B1 | 9/2002 | Young |
| 6,467,008 B1 | 10/2002 | Gentry et al. |
| 6,470,026 B1 | 10/2002 | Pearson et al. |
| 6,480,500 B1 | 11/2002 | Erimli et al. |
| 6,509,988 B1 | 1/2003 | Saito |
| 6,522,656 B1 | 2/2003 | Gridley |
| 6,532,212 B1 | 3/2003 | Soloway et al. |
| 6,553,036 B1 | 4/2003 | Miller et al. |
| 6,563,796 B1 | 5/2003 | Saito |
| 6,570,850 B1 | 5/2003 | Gutierrez et al. |
| 6,570,853 B1 | 5/2003 | Johnson et al. |
| 6,594,231 B1 | 7/2003 | Byham et al. |
| 6,597,691 B1 | 7/2003 | Anderson et al. ............ 370/360 |
| 6,597,777 B1 | 7/2003 | Ho |
| 6,606,690 B2 | 8/2003 | Padovano |
| 6,614,796 B1 | 9/2003 | Black et al. |
| 6,622,206 B1 | 9/2003 | Kanamaru et al. |
| 6,629,161 B2 | 9/2003 | Matsuki et al. |
| 6,643,298 B1 | 11/2003 | Brunheroto et al. |
| 6,657,962 B1 | 12/2003 | Barri et al. |
| 6,684,209 B1 | 1/2004 | Ito et al. |
| 6,697,359 B1 | 2/2004 | George ........................ 370/357 |
| 6,697,368 B2 | 2/2004 | Chang et al. |
| 6,697,914 B1 | 2/2004 | Hospodor et al. |
| 6,718,497 B1 | 4/2004 | Whitby-Strevens |
| 6,738,381 B1 | 5/2004 | Agnevik et al. |
| 6,744,772 B1 | 6/2004 | Eneboe et al. |
| 6,760,302 B1 | 7/2004 | Ellinas et al. |
| 6,765,871 B1 | 7/2004 | Knobel et al. |
| 6,779,083 B2 | 8/2004 | Ito et al. |
| 6,785,241 B1 | 8/2004 | Lu et al. |
| 6,807,181 B1 | 10/2004 | Weschler |
| 6,816,492 B1 | 11/2004 | Turner et al. |
| 6,816,750 B1 | 11/2004 | Klaas |

| | | | |
|---|---|---|---|
| 6,859,435 B1 | 2/2005 | Lee et al. | |
| 6,865,155 B1 | 3/2005 | Wong et al. | |
| 6,865,157 B1 | 3/2005 | Scott et al. | |
| 6,888,831 B1 | 5/2005 | Hospodor et al. | |
| 6,901,072 B1 | 5/2005 | Wong | |
| 6,904,507 B2 | 6/2005 | Gil | |
| 6,922,408 B2 | 7/2005 | Bloch et al. | |
| 6,928,470 B1 | 8/2005 | Hamlin | |
| 6,934,799 B2 | 8/2005 | Acharya et al. | |
| 6,941,357 B2 | 9/2005 | Nguyen et al. | |
| 6,941,482 B2 | 9/2005 | Strong | |
| 6,952,659 B2 | 10/2005 | King et al. | |
| 6,968,463 B2 | 11/2005 | Pherson et al. | |
| 6,975,627 B1 | 12/2005 | Parry et al. | |
| 6,987,768 B1 | 1/2006 | Kojima et al. | |
| 6,988,130 B2 | 1/2006 | Blumenau et al. | |
| 6,988,149 B2 | 1/2006 | Odenwald | |
| 7,000,025 B1 | 2/2006 | Wilson | |
| 7,002,926 B1 | 2/2006 | Eneboe et al. | |
| 7,010,607 B1 | 3/2006 | Bunton | |
| 7,024,410 B2 | 4/2006 | Ito et al. | |
| 7,031,615 B2 | 4/2006 | Genrile | |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,051,182 B2 | 5/2006 | Blumenau et al. | |
| 7,055,068 B2 | 5/2006 | Riedl | |
| 7,061,862 B2 | 6/2006 | Horiguchi et al. | |
| 7,061,871 B2 | 6/2006 | Sheldon et al. | |
| 7,076,569 B1 | 7/2006 | Bailey et al. | |
| 7,092,374 B1 | 8/2006 | Gubbi | |
| 7,110,394 B1 | 9/2006 | Chamdani et al. | |
| 7,120,728 B2 | 10/2006 | Krakirian et al. | |
| 7,123,306 B1 | 10/2006 | Goto et al. | |
| 7,124,169 B2 | 10/2006 | Shimozono et al. | |
| 7,150,021 B1 | 12/2006 | Vajjhala et al. | |
| 7,151,778 B2 | 12/2006 | Zhu et al. | |
| 7,171,050 B2 | 1/2007 | Kim | |
| 7,185,062 B2 | 2/2007 | Lolayekar et al. | |
| 7,187,688 B2 | 3/2007 | Garmire et al. | |
| 7,188,364 B2 | 3/2007 | Volpano | |
| 7,190,667 B2 | 3/2007 | Susnow et al. | |
| 7,194,538 B1 | 3/2007 | Rabe et al. | |
| 7,200,108 B2 | 4/2007 | Beer et al. | |
| 7,209,478 B2 | 4/2007 | Rojas et al. | |
| 7,215,680 B2 | 5/2007 | Mullendore et al. | |
| 7,221,650 B1 | 5/2007 | Cooper et al. | |
| 7,230,929 B2 | 6/2007 | Betker et al. | |
| 7,233,570 B2 | 6/2007 | Gregg | |
| 7,233,985 B2 | 6/2007 | Hahn et al. | |
| 7,245,613 B1 | 7/2007 | Winkles et al. | |
| 7,245,627 B2 | 7/2007 | Goldenberg et al. | |
| 7,248,580 B2 | 7/2007 | George et al. | |
| 7,263,593 B2 | 8/2007 | Honda et al. | |
| 7,266,286 B2 | 9/2007 | Tanizawa et al. | |
| 7,269,131 B2 | 9/2007 | Cashman et al. | |
| 7,269,168 B2 | 9/2007 | Roy et al. | |
| 7,277,431 B2 | 10/2007 | Walter et al. | |
| 7,287,063 B2 | 10/2007 | Baldwin et al. | |
| 7,292,593 B1 | 11/2007 | Winkles et al. | |
| 7,315,511 B2 | 1/2008 | Morita et al. | |
| 7,327,680 B1 | 2/2008 | Kloth | |
| 7,346,707 B1 | 3/2008 | Erimli | |
| 7,352,740 B2 | 4/2008 | Hammons et al. | |
| 7,397,788 B2 | 7/2008 | Mies et al. | |
| 7,406,034 B1 | 7/2008 | Cometto et al. | |
| 7,443,794 B2 | 10/2008 | George et al. | |
| 7,460,534 B1 | 12/2008 | Ballenger | |
| 7,466,700 B2 | 12/2008 | Dropps et al. | |
| 7,471,691 B2 | 12/2008 | Black et al. | |
| 2001/0011357 A1 | 8/2001 | Mori | |
| 2001/0022823 A1 | 9/2001 | Renaud | |
| 2001/0033552 A1 | 10/2001 | Barrack et al. | |
| 2001/0038628 A1 | 11/2001 | Ofek et al. | 370/392 |
| 2001/0043564 A1 | 11/2001 | Bloch et al. | |
| 2001/0047460 A1 | 11/2001 | Kobayashi et al. | |
| 2002/0016838 A1 | 2/2002 | Geluc et al. | |
| 2002/0034178 A1 | 3/2002 | Schmidt et al. | |
| 2002/0071387 A1 | 6/2002 | Horiguchi et al. | |
| 2002/0103913 A1 | 8/2002 | Tawil et al. | |
| 2002/0104039 A1 | 8/2002 | DeRolf et al. | |
| 2002/0118692 A1 | 8/2002 | Oberman et al. | |
| 2002/0122428 A1 | 9/2002 | Fan et al. | |
| 2002/0124124 A1 | 9/2002 | Matsumoto et al. | |
| 2002/0147560 A1 | 10/2002 | Devins et al. | |
| 2002/0147843 A1 | 10/2002 | Rao | |
| 2002/0156918 A1 | 10/2002 | Valdevit et al. | |
| 2002/0159385 A1 * | 10/2002 | Susnow et al. | 370/229 |
| 2002/0172195 A1 | 11/2002 | Pekkala et al. | |
| 2002/0191602 A1 | 12/2002 | Woodring et al. | |
| 2002/0194294 A1 | 12/2002 | Blumenau et al. | |
| 2002/0196773 A1 | 12/2002 | Berman | |
| 2003/0002503 A1 | 1/2003 | Brewer et al. | |
| 2003/0002516 A1 | 1/2003 | Boock et al. | |
| 2003/0016683 A1 | 1/2003 | George et al. | |
| 2003/0021239 A1 | 1/2003 | Mullendore et al. | |
| 2003/0026267 A1 | 2/2003 | Oberman et al. | |
| 2003/0026287 A1 | 2/2003 | Mullendore et al. | |
| 2003/0033487 A1 | 2/2003 | Pfister et al. | |
| 2003/0035433 A1 | 2/2003 | Craddock et al. | |
| 2003/0046396 A1 | 3/2003 | Richter et al. | |
| 2003/0056000 A1 | 3/2003 | Mullendore et al. | |
| 2003/0063567 A1 | 4/2003 | Dehart | |
| 2003/0072316 A1 | 4/2003 | Niu et al. | |
| 2003/0076788 A1 | 4/2003 | Grabauskas et al. | |
| 2003/0079019 A1 | 4/2003 | Lolayekar et al. | |
| 2003/0084219 A1 | 5/2003 | Yao et al. | |
| 2003/0086377 A1 | 5/2003 | Berman | |
| 2003/0091062 A1 | 5/2003 | Lay et al. | |
| 2003/0093607 A1 | 5/2003 | Main et al. | |
| 2003/0103451 A1 | 6/2003 | Lutgen et al. | |
| 2003/0112819 A1 | 6/2003 | Kofoed et al. | |
| 2003/0117961 A1 | 6/2003 | Chuah et al. | |
| 2003/0118053 A1 | 6/2003 | Edsall et al. | |
| 2003/0120743 A1 | 6/2003 | Coatney et al. | |
| 2003/0120791 A1 | 6/2003 | Weber et al. | |
| 2003/0120983 A1 | 6/2003 | Vieregge et al. | |
| 2003/0126223 A1 | 7/2003 | Jenne et al. | |
| 2003/0126242 A1 | 7/2003 | Chang | |
| 2003/0131105 A1 | 7/2003 | Czeiger et al. | |
| 2003/0137941 A1 | 7/2003 | Kaushik et al. | |
| 2003/0139900 A1 | 7/2003 | Robison | |
| 2003/0172149 A1 | 9/2003 | Edsall et al. | |
| 2003/0172239 A1 | 9/2003 | Swank | |
| 2003/0174652 A1 * | 9/2003 | Ebata | 370/235 |
| 2003/0174721 A1 | 9/2003 | Black et al. | |
| 2003/0174789 A1 | 9/2003 | Waschura et al. | |
| 2003/0179709 A1 | 9/2003 | Huff | |
| 2003/0179748 A1 | 9/2003 | George et al. | 370/389 |
| 2003/0189930 A1 | 10/2003 | Terrell et al. | |
| 2003/0189935 A1 | 10/2003 | Warden et al. | |
| 2003/0191857 A1 | 10/2003 | Terrell et al. | |
| 2003/0195983 A1 | 10/2003 | Krause | |
| 2003/0198238 A1 | 10/2003 | Westby | |
| 2003/0200315 A1 | 10/2003 | Goldenberg et al. | |
| 2003/0218986 A1 | 11/2003 | DeSanti et al. | |
| 2003/0229808 A1 | 12/2003 | Heintz et al. | |
| 2003/0236953 A1 | 12/2003 | Grieff et al. | |
| 2004/0013088 A1 | 1/2004 | Gregg | |
| 2004/0013092 A1 | 1/2004 | Betker et al. | |
| 2004/0013113 A1 | 1/2004 | Singh et al. | |
| 2004/0013125 A1 | 1/2004 | Betker et al. | |
| 2004/0015638 A1 | 1/2004 | Bryn | |
| 2004/0024831 A1 | 2/2004 | Yang et al. | |
| 2004/0028038 A1 | 2/2004 | Anderson et al. | |

| | | |
|---|---|---|
| 2004/0054776 A1 | 3/2004 | Klotz et al. |
| 2004/0054866 A1 | 3/2004 | Blumenau et al. |
| 2004/0057389 A1 | 3/2004 | Klotz et al. |
| 2004/0064664 A1 | 4/2004 | Gil |
| 2004/0081186 A1 | 4/2004 | Warren et al. |
| 2004/0081196 A1 | 4/2004 | Elliott |
| 2004/0081394 A1 | 4/2004 | Biren et al. |
| 2004/0085955 A1 | 5/2004 | Walter et al. |
| 2004/0085974 A1 | 5/2004 | Mies et al. |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0125799 A1 | 7/2004 | Buer |
| 2004/0141518 A1 | 7/2004 | Milligan et al. |
| 2004/0141521 A1 | 7/2004 | George .................. 370/463 |
| 2004/0151188 A1 | 8/2004 | Maveli et al. |
| 2004/0153526 A1 | 8/2004 | Haun et al. |
| 2004/0153566 A1 | 8/2004 | Lalsangi et al. |
| 2004/0153914 A1 | 8/2004 | El-Batal |
| 2004/0174813 A1 | 9/2004 | Kasper et al. |
| 2004/0202189 A1 | 10/2004 | Arndt et al. |
| 2004/0208201 A1 | 10/2004 | Otake |
| 2004/0218531 A1 | 11/2004 | Cherian et al. |
| 2004/0267982 A1 | 12/2004 | Jackson et al. |
| 2005/0018673 A1 | 1/2005 | Dropps et al. |
| 2005/0023656 A1 | 2/2005 | Leedy |
| 2005/0036485 A1 | 2/2005 | Eilers et al. |
| 2005/0036499 A1 | 2/2005 | Dutt et al. |
| 2005/0036763 A1 | 2/2005 | Kato et al. |
| 2005/0047334 A1 | 3/2005 | Paul et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0108444 A1 | 5/2005 | Flauaus et al. |
| 2005/0111845 A1 | 5/2005 | Nelson et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0143300 A1 | 6/2006 | See et al. |
| 2006/0184711 A1 | 8/2006 | Pettey |
| 2006/0203725 A1 | 9/2006 | Paul et al. |
| 2006/0274744 A1 | 12/2006 | Nagai et al. |
| 2007/0206502 A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing" , dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

"Office Action from USPTO dated Jan. 19, 2006 for U.S. Appl. No. 10/212,425".

"Office Action from USPTO dated Dec. 5, 2006 for U.S. Appl. No. 10/212,425".

"Office Action from USPTO dated Sep. 4, 2007 for U.S. Appl. No. 10/889,551".

"Office Action from USPTO dated Sep. 20, 2007 for U.S. Appl. No. 10/889,259".

"Office Action from USPTO dated Sep. 19, 2007 for U.S. Appl. No. 10/894,492".

"Office Action from USPTO dated Oct. 4, 2007 for U.S. Appl. No. 10/894,627".

"Office Action from USPTO dated Oct. 25, 2007 for U.S. Appl. No. 10/894,491".

"Office Action from USPTO dated Oct. 23, 2007 for U.S. Appl. No. 10/894,597".

"Office Action from USPTO dated Oct. 25, 2007 for U.S. Appl. No. 10/894,579".

"Office Action from USPTO dated Oct. 11, 2007 for U.S. Appl. No. 10/894,629".

"Office Action from USPTO dated Oct. 25, 2007 for U.S. Appl. No. 10/894,536".

"Office Action from USPTO dated Nov. 13, 2007 for U.S. Appl. No. 10/894,586".

"Office Action from USPTO dated Oct. 17, 2007 for U.S. Appl. No. 10/894,917".

"Office Action from USPTO dated Jun. 28, 2007 for U.S. Appl. No. 10/894,529".

"Office Action from USPTO dated Sep. 14, 2007 for U.S. Appl. No. 10/894,978".

"Office Action from USPTO dated Apr. 6, 2007 for U.S. Appl. No. 10/956,718".

"Office Action from USPTO dated Oct. 3, 2007 for U.S. Appl. No. 10/956,717".

"Office Action from USPTO dated Jun. 1, 2007 for U.S. Appl. No. 10/961,463".

"Office Action from USPTO dated Sep. 6, 2007 for U.S. Appl. No. 10/889,337".

"Office Action from USPTO dated May 21, 2007 for U.S. Appl. No. 10/212,425".

"Office Action from USPTO dated Oct. 18, 2006 for U.S. Appl. No. 10/241,153".

"Office Action from USPTO dated Apr. 3, 2007 for U.S. Appl. No. 10/241,153".

"Office Action from USPTO dated Nov. 16, 2007 for U.S. Appl. No. 10/241,153".

"Office Action from USPTO dated Nov. 15, 2006 for U.S. Appl. No. 10/263,858".

"Office Action from USPTO dated Jul. 11, 2007 for U.S. Appl. No. 10/263,858".

"Office Action from USPTO dated Jan. 19, 2007 for U.S. Appl. No. 10/302,149".

"Office Action from USPTO dated Aug. 20, 2007 for U.S. Appl. No. 10/302,149".

"Office Action from USPTO dated Jul. 3, 2007 2007 for U.S. Appl. No. 10/664,548".

"Office Action from USPTO dated Sep. 20, 2007 for U.S. Appl. No. 10/798,527".

"Office Action from USPTO dated Sep. 20, 2007 for U.S. Appl. No. 10/889,267".

"Office Action from USPTO dated Aug. 31, 2007 for U.S. Appl. No. 10/889,635".

"Office Action from USPTO dated Mar. 21, 2006 for U.S. Appl. No. 10/889,588".

"Office Action from USPTO dated Sep. 10, 2007 for U.S. Appl. No. 10/889,255".

"Office Action from USPTO dated Dec. 7, 2007 for U.S. Appl. No. 10/961,463".

Malavalli, et al., "Fibre Channel Framing and Signaling (FC-FS) REV 1.10", *NCITS working draft proposed American National Standard for Information Technology*, (Jan. 25, 2001).

Naik, D. "Inside Windows Storage:Server Storage Technologies for Windows 2000, Windows Server 2003 and Beyond", *Addison-Wesley, US, Chapter 5, XP-002381152*, (Jul. 15, 2003), 137-173.

"Deliver Server-Free Backup", *Pathlight & Computer Associates*, White Paper of Apr. 2000, Ithaca, New York, XP-002381153, 1-8.

Banks, David C., et al., "Link Trunking and Measuring Link Latency in Fibre Channel Fabric", U.S. Appl. No. 60/286,046, 1-52.

Brown, Douglas W., "A State-Machine Synthesizer", *18th Design Automation Conference*, (1981),301-305.

Curtis, A. R., "Design Considerations for 10-Gbit Fibre Channel", *Curtis A. Ridgeway, Distinguished I/O Architect, Storage and Computing ASIC's Division*, LSI Logic Corp.

Malavalli, Kumar, "High Speed Fibre Channel Switching Fabric Devices", *Proceedings of the SPIE*, SPIE, Bellingham, VA, USA vol. 1577,, XP000562869, ISSN: 0277-786X,(Sep. 4, 1991),216-226.

Melham, et al., "Minimizing Wavelength Conversions in WDM Path Establishment", Computer Science Department, University of Pittsburgh, Pittsburgh, PA 15260, (2001), 197-211.

Ridgeway, Curt , "0GFC-40GFC using 4-lane XAUI's", *LSI Logic Presentation—T11/03-069v0*.

"Final Office Action from USPTO dated May 12, 2008 for U.S. Appl. No. 10/894,492".

"Final Office Action from USPTO dated Apr. 29, 2008 for U.S. Appl. No. 10/894,491".

"Office Action from USPTO dated May 15, 2008 for U.S. Appl. No. 10/798,527".

"Office Action from USPTO dated May 14, 2008 for U.S. Appl. No. 10/956,502".

"Office Action from USPTO dated May 2, 2008 for U.S. Appl. No. 11/037,922".

"Notice of Allowance from USPTO dated Apr. 4, 2008 for U.S. Appl. No. 11/608,634".

"Office Action from USPTO dated Apr. 4, 2008 for U.S. Appl. No. 10/957,465".

"Notice of Allowance from USPTO dated Apr. 10, 2008 for U.S. Appl. No. 10/241,153".

"Office Action from USPTO dated Apr. 11, 2008 for U.S. Appl. No. 10/894,595".

"Office Action from USPTO dated Apr. 14, 2008 for U.S. Appl. No. 10/894,627".

"Office Action from USPTO dated Apr. 17, 2008 for U.S. Appl. No. 10/894,689".

"Notice of Allowance from USPTO dated Apr. 18, 2008 for U.S. Appl. No. 10/894,597".

"Final Office Action from USPTO dated Apr. 23, 2008 for U.S. Appl. No. 10/889,255".

"Final Office Action from USPTO dated Apr. 25, 2008 for U.S. Appl. No. 10/894,579".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Notice of Allowance from USPTO dated Jan. 8, 2008 for U.S. Appl. No. 10/889,551".

"Office Action from USPTO dated Jan. 9, 2008 for U.S. Appl. No. 11/608,634".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

"Notice of Allowance from USPTO dated Feb. 8, 2008 for U.S. Appl. No. 10/894,529".

"Office Action from USPTO dated Feb. 12, 2008 for U.S. Appl. No. 11/057,912".

"Office Action from USPTO dated Mar. 5, 2008 for U.S. Appl. No. 10/889,259".

"Office Action from USPTO dated Mar. 7, 2008 for U.S. Appl. No. 10/894,629".

"Office Action from USPTO dated Mar. 20, 2008 for U.S. Appl. No. 10/894,732".

"Final Office Action from USPTO dated Apr. 1, 2008 for U.S. Appl. No. 10/956,717".

"Office Action from USPTO dated Apr. 3, 2008 for U.S. Appl. No. 10/894,587".

"Office Action from USPTO dated Jun. 27, 2008 for U.S. Appl. No. 10/894,726".

"Final Office Action from USPTO dated Jun. 10, 2008 for U.S. Appl. No. 10/894,586".

"Final Office Action from USPTO dated Jun. 4, 2008 for U.S. Appl. No. 10/894,978".

"Final Office Action from USPTO dated Jun. 5, 2008 for U.S. Appl. No. 10/889,267".

"Office Action from USPTO dated Jun. 25, 2008 for U.S. Appl. No. 10/895,175".

"Notice of Allowance from USPTO dated Jun. 25, 2008 for U.S. Appl. No. 10/894,491".

"Notice of Allowance from USPTO dated Jun. 27, 2008 for U.S. Appl. No. 10/956,717".

"Office Action from USPTO dated Jun. 26, 2008 for U.S. Appl. No. 10/894,547".

"Final Office Action from USPTO dated Jul. 9, 2008 for U.S. Appl. No. 10/894,917".

"Notice of Allowance from USPTO dated Jul. 9, 2008 for U.S. Appl. No. 10/894,629".

"Notice of Allowance from USPTO dated Jul. 9, 2008 for U.S. Appl. No. 10/894,579".

"Notice of Allowance from USPTO dated Jul. 17, 2008 for U.S. Appl. No. 10/894,536".

"Office Action from USPTO dated Jul. 25, 2008 for U.S. Appl. No. 10/894,827".

"Office Action from State Intellectual Property Office (SIPO) of China for Chinese application 200580032889.0".

"Final Office Action from USPTO Dated Aug. 4, 2008 for U.S. Appl. No. 10/894,732".

"Notice of Allowance from USPTO dated Aug. 18, 2008 for U.S. Appl. No. 10/889,259".

"Office Action from USPTO dated Sep. 18, 2008 for U.S. Appl. No. 10/894,978".

"Notice of Allowance from the USPTO dated Sep. 29, 2008 for U.S. Appl. No. 10/889,267".

"Notice of Allowance from USPTO dated Oct. 8, 2008 for U.S. Appl. No. 10/889,255".

"Final Office Action from USPTO dated Oct. 17, 2008 for U.S. Appl. No. 10/894,595".

"Office Action from USPTO dated Sep. 23, 2008 for U.S. Appl. No. 12/031,585".

"Office Action from USPTO dated Nov. 13, 2008 for U.S. Appl. No. 10/894,917".

"Final Office Action from USPTO dated Nov. 13, 2008 for U.S. Appl. No. 10/894,587".

"Notice of Allowance from USPTO dated Oct. 8, 2008 for U.S. Appl. No. 10/798,527".

"Notice of Allowance from USPTO dated Oct. 15, 2008 for U.S. Appl. No. 10/894,492".

"Final Office Action from USPTO dated Oct. 8, 2008 for U.S. Appl. No. 11/057,912".

"Non-Final Office Action from USPTO dated Oct. 10, 2008 for U.S. Appl. No. 10/894,627".

"Office Action from USPTO dated Nov. 26, 2008 for U.S. Appl. No. 10/956,502".

"Office Action from USPTO dated Nov. 26, 2008 for U.S. Appl. No. 10/894,547".

"Final Office Action from USPTO dated Dec. 24, 2008 for U.S. Appl. No. 10/894,726".

"Notice of Allowance from USPTO dated Dec. 30, 2008 for U.S. Appl. No. 11/037,922".

"Final Office Action from USPTO dated Jan. 21, 2009 for U.S. Appl. No. 10/894,827".

"Office Action from USPTO dated Jan. 17, 2009 for U.S. Appl. No. 10/894,586".

"Final Office Action from USPTO dated Jan. 26, 2009 for U.S. Appl. No. 10/895,175".

"Notice of Allowance from USPTO dated Feb. 10, 2009 for U.S. Appl. No. 10/894,595".

"Office Action from USPTO dated Feb. 17, 2009 for U.S. Appl. No. 10/894,732".

"Notice of Allowance from USPTO dated Feb. 25, 2009 for U.S. Appl. No. 10/894,827".

"Notice of Allowance from USPTO dated Feb. 27, 2009 for U.S. Appl. No. 10/895,175".

"Notice of Allowance from USPTO dated Mar. 6, 2009 for U.S. Appl. No. 10/956,502".

"Office Action from USPTO dated Mar. 9, 2009 for U.S. Appl. No. 11/057,912".

"Notice of Allowance from USPTO dated Mar. 9, 2009 for U.S. Appl. No. 10/889,635".

"Office Action from USPTO dated Mar. 16, 2009 for U.S. Appl. No. 10/956,501".

"Notice of Allowance from USPTO dated Mar. 20, 2009 for U.S. Appl. No. 10/894,978".

International Preliminary Report on Patentability dated Apr. 3, 2007, for International patent application No. PCT/US2005/034844.

International Preliminary Report on Patentability dated Apr. 3, 2007, for International patent application No. PCT/US2005/034758.

International Preliminary Report on Patentability dated Apr. 11, 2007, for International patent application No. PCT/US2005/034845.

International Preliminary Report on Patentability dated Apr. 3, 2007, for International patent application No. PCT/US2005/035064.

International Preliminary Report on Patentability dated Jul. 24, 2007, for International patent application No. PCT/US2005/42528.

* cited by examiner

METHOD AND SYSTEM FOR REDUCING DEADLOCK IN FIBRE CHANNEL FABRICS USING VIRTUAL LANES

CROSS REFERENCE TO RELATED APPLICATIONS

This application claims priority to U.S. provisional patent application Ser. No. 60/542,241, filed on Feb. 05, 2004, the disclosure of which is incorporated herein by reference in its entirety.

BACKGROUND

1. Field of the Invention

The present invention relates to Fibre Channel systems, and more particularly, to reducing deadlock problems in Fibre Channel Fabrics.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

The following Fibre Channel standards are used for Fibre Channel systems and Fibre Channel Fabrics, and are incorporated herein by reference in their entirety:

ANSI INCITS xxx-200x Fibre Channel Framing and Signaling Interface (FC-FS)—T11/Project 1331D; and ANSI INCITS xxx-200x Fibre Channel Switch Fabric-3(FC-SW-3), T11/Project 1508D As discussed above, a Fibre Channel Fabric can consist of multiple switches connected in an arbitrary topology. The links between the switches use a buffer-to-buffer credit scheme for flow control so that all frames transmitted have a receive buffer. Fabric deadlock may occur if a switch cannot forward frames because the recipient switch buffers (receive buffers) are full.

The following example, described with respect to FIG. 6, shows how a deadlock situation can occur. FIG. 6 shows five switches ("SW") 1, 2, 3, 4, and 5 that are linked together by ISLs (Inter Switch Links) in a ring topology. Host 11 and target 21 are linked to switch 1, host 12 and target 22 are linked to switch 2, and so forth.

In this example, hosts 11-15 can send data as fast as they can to a target that is two (2) hops away, for example:

Host 11 can send data to target 23;
Host 12 can send data to target 24;
Host 13 can send data to target 25;
Host 14 can send data to target 21; and
Host 15 can send data to target 22

For illustration purposes only, all traffic goes in the clockwise direction in FIG. 6.

The receive buffers available for each ISL in the direction of traffic may get filled with frames addressed to the next switch.

For example:

For the ISL between switch 1 and switch 2, the receive buffers on switch 2 get filled with frames for switch 3;
For the ISL between switch 2 and switch 3, the receive buffers on switch 3 get filled with frames for switch 4;
For the ISL between switch 3 and switch 4, the receive buffers on switch 4 get filled with frames for switch 5;
For the ISL between switch 4 and 5, the receive buffers on 5 get filled with frames for switch 1; and
For the ISL between switch 5 and switch 1, the receive buffers on switch 1 get filled with frames for switch 2.

The transmit side of a switch waits for R_RDYs before it can transmit any frames. If frames cannot be transmitted from one ISL, then the receive buffers for the other ISL cannot be emptied. If the receive buffers cannot be emptied, no R_RDY flow control signals can be transmitted, which deadlocks the Fabric.

Many large Fabrics have paths that form rings within them, especially if they are designed to avoid single points of failure by using redundant switches. Such network traffic patterns may result in a deadlock situation disrupting networks using fibre channel switches and components.

Therefore, there is need for a system and method for minimizing deadlock problems in fibre channel switches.

SUMMARY OF THE PRESENT INVENTION

In one aspect of the present invention, a method for processing fibre channel frames is provided. The method includes, assigning a virtual lane for a frame based on a hop count for the frame; determining if the assigned virtual lane has available credit; and transmitting the frame if credit is available.

The method also includes, incrementing a counter value for counting available credit for the assigned virtual lane, if the frame is sent using the assigned virtual lane. If all credit for the assigned virtual lane has been used, then a next virtual lane is selected with non-zero credit.

In yet another aspect of the present invention, a method for processing fibre channel frames using a fabric switch element having a receive port and a transmit port is provided. The method includes assigning a virtual lane in the receive port based on a hop count for the frame; and sending a primitive to a transmit port with the assigned virtual lane.

The method further includes, assigning a virtual lane on the transmit port based on the hop count of the frame; and determining if credit is available for the assigned virtual lane to send the frame. A credit count for the assigned virtual lane is maintained by a counter and the assigned virtual lane has a maximum credit count.

In another aspect of the present invention, a system for processing fibre channel frames is provided. The system includes, a fibre channel fabric switch element including a receive port for receiving fibre channel frames, which includes a look up table to assign a virtual lane based on a hop count of the frame; and a transmit port that receives a primitive with the assigned virtual lane by the receive port and the transmit port includes a credit control module that determines if an assigned virtual lane can transmit a frame based on available credit.

The credit control module increments a credit count for an assigned virtual lane if a frame has been transmitted from the assigned virtual lane. The credit control module also decrements a credit count for an assigned virtual lane if a VC_RDY is received. The credit control module also maintains a maximum count for every virtual lane used for transmitting frames. An increment selector is used to increment credit count and a decrement selector is used to decrease the credit count. The credit control module also uses compare logic to compare available credit for an assigned virtual lane at any given time with a programmed maximum credit value for the assigned virtual lane.

In yet another aspect of the present invention, a system for processing fibre channel frames is provided. The system includes, the means for assigning dedicated virtual lanes for transmitting frames, where the virtual lanes are assigned based on a hop count of a frame; means for maintaining a credit count for each virtual lane used for transmitting frames; and means for determining if credit is available for a particular virtual lane that is assigned based on the hop count.

The system also includes the means for maintaining a maximum credit count for each virtual lane; and means for comparing the maximum credit count with the credit available for a virtual lane at any given time.

In yet another aspect of the present invention, a fibre channel fabric switch element for processing fibre channel frames, is provided. The switch element includes, means for assigning dedicated virtual lanes for transmitting frames, where the virtual lanes are assigned based on a hop count of a frame; means for maintaining a credit count for each virtual lane used for transmitting frames; and means for determining if credit is available for a particular virtual lane that is assigned based on the hop count.

The switch element also includes, means for maintaining a maximum credit count for each virtual lane; and means for comparing the maximum credit count with the credit available for a virtual lane at any given time.

In yet another aspect, the present invention reduces/prevents the deadlock by separating frames queued for transmission into virtual lanes, each with its own transmit queue and flow control. Flow control uses the Fibre Channel VC_RDY primitive signal to give separate flow control signals to each virtual lane. Also, no frames are discarded to reduce/avoid deadlock.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"D_ID": 24-bit fibre channel header field that contains destination address.

"EOF": End of Frame

"E-Port": A fabric expansion port that attaches to another Interconnect port to create an Inter-Switch Link.

"F-Port": A port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": A topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link" ("ISL"): A Link directly connecting the E_port of one switch to the E_port of another switch.

Port: A general reference to N.Sub._-- Port or F.Sub._--Port.

"L_Port": A port that contains Arbitrated Loop functions associated with the Arbitrated Loop topology.

"N-Port": A direct fabric attached port.

"NL_Port": A L_Port that can perform the function of a N_Port.

"S_ID": 24 bit fibre channel header field that contains the source address of a frame.

"SOF": Start of Frame

"Switch": A fabric element conforming to the Fibre Channel Switch standards.

"VL" (Virtual Lane): A virtual portion of the data path between a source and destination port each having independent buffer to buffer flow control.

To facilitate an understanding of the preferred embodiment, the general architecture and operation of a fibre channel system will be described. The specific architecture and operation of the preferred embodiment will then be described with reference to the general architecture of the fibre channel system.

Figure 1A:
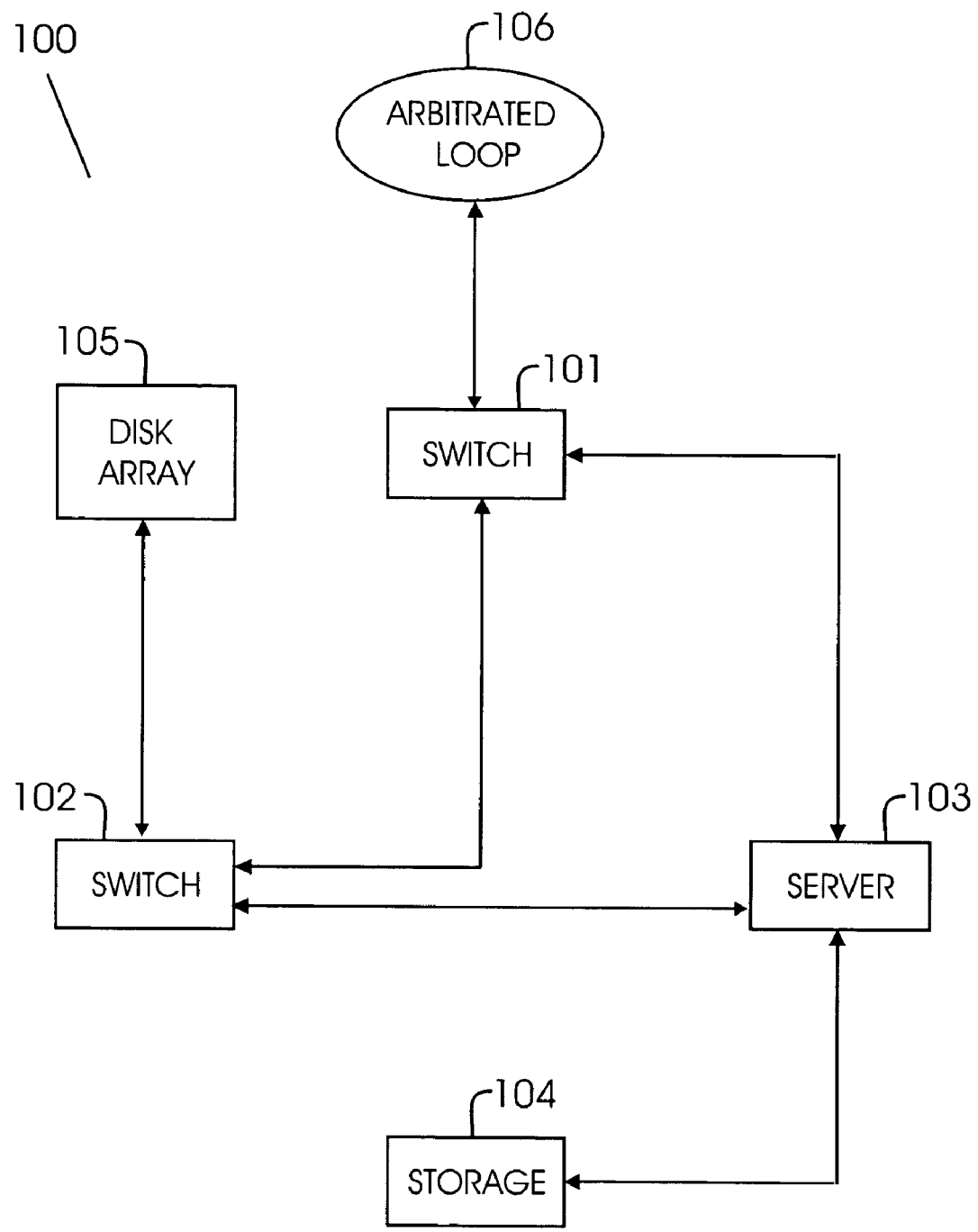
FIG. 1A is a block diagram of a fibre channel network.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Figure 1B:
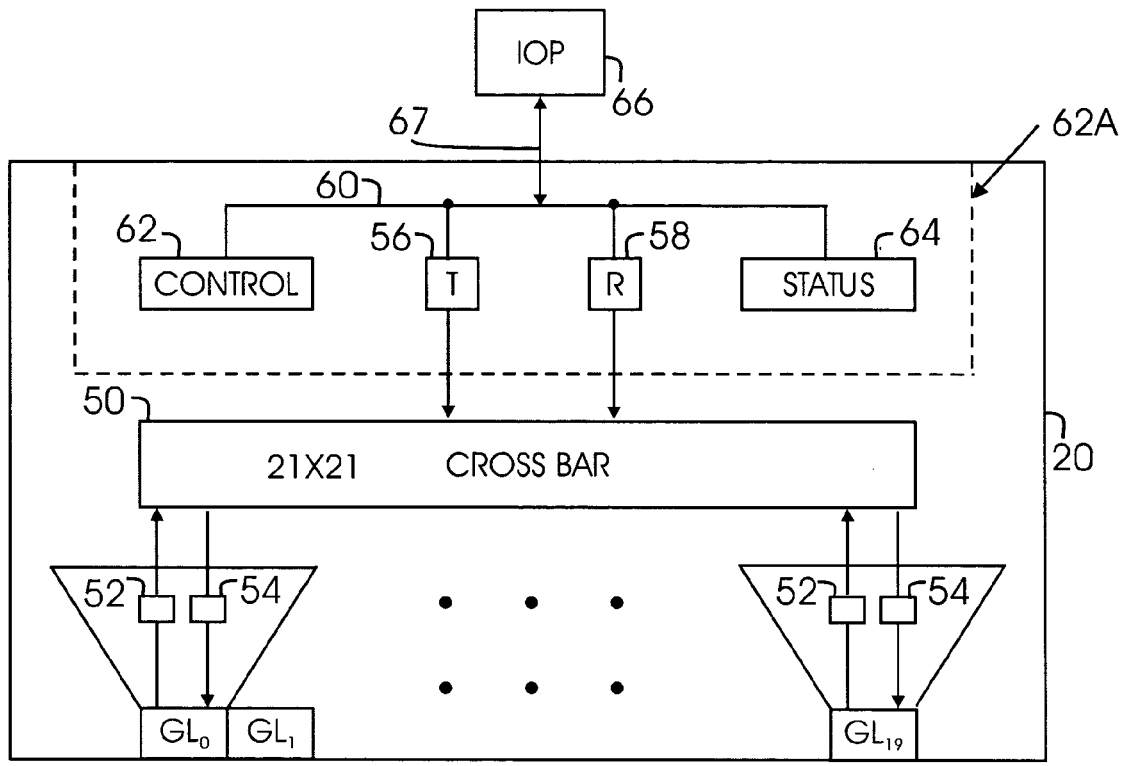
FIGS. 1B-1D show block diagrams of fibre channel fabric switch elements, used according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for other fibre channel classes of service, within the scope and operation of the present invention as described herein.

The fabric element of the present invention is presently implemented as a single CMOS ASIC, and for this reason the term "fabric element" and ASIC are used interchangeably to refer to the preferred embodiments in this specification.

Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL_Port can function as any type of port. Also, the GL_Port may function as a special port useful in fabric element linking, as described below.

For illustration purposes only, all GL_Ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL_Ports plus a port for connection to a fabric controller, which may be external or internal to ASIC 20.

Figure 1C:
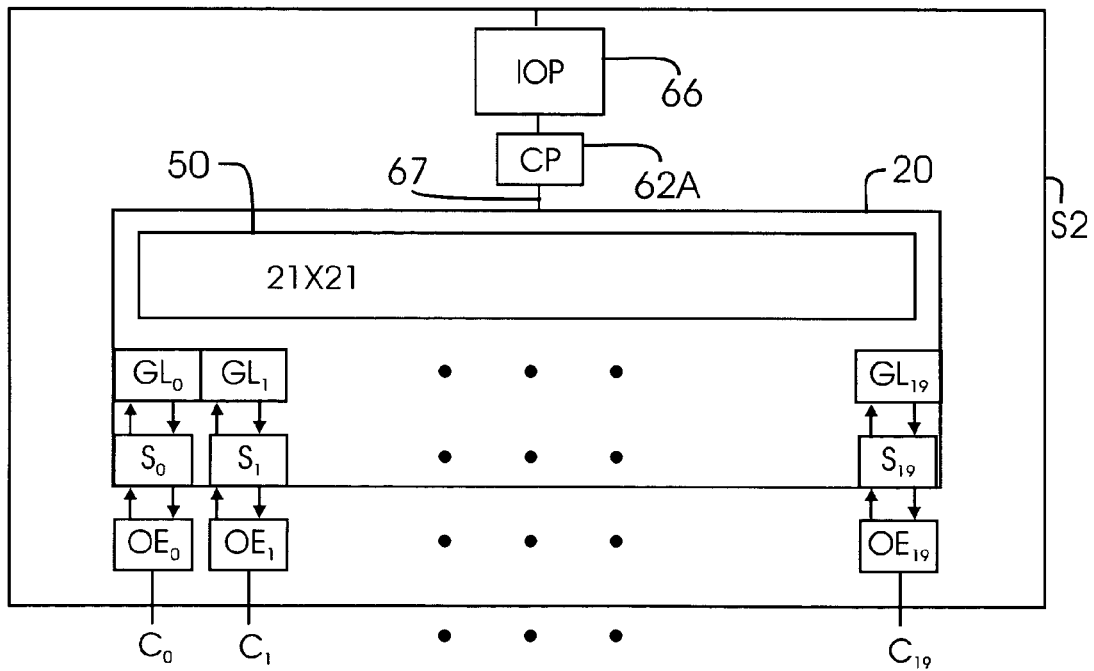

In the preferred embodiments of switch chasis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through path 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL_Ports correspond to channel C0-C19. Each GL_Port has a serial/deserializer (SERDES) designated as S0-S19. Ideally, the SERDES functions are implemented on ASIC 20 for efficiency, but may alternatively be external to each GL_Port.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
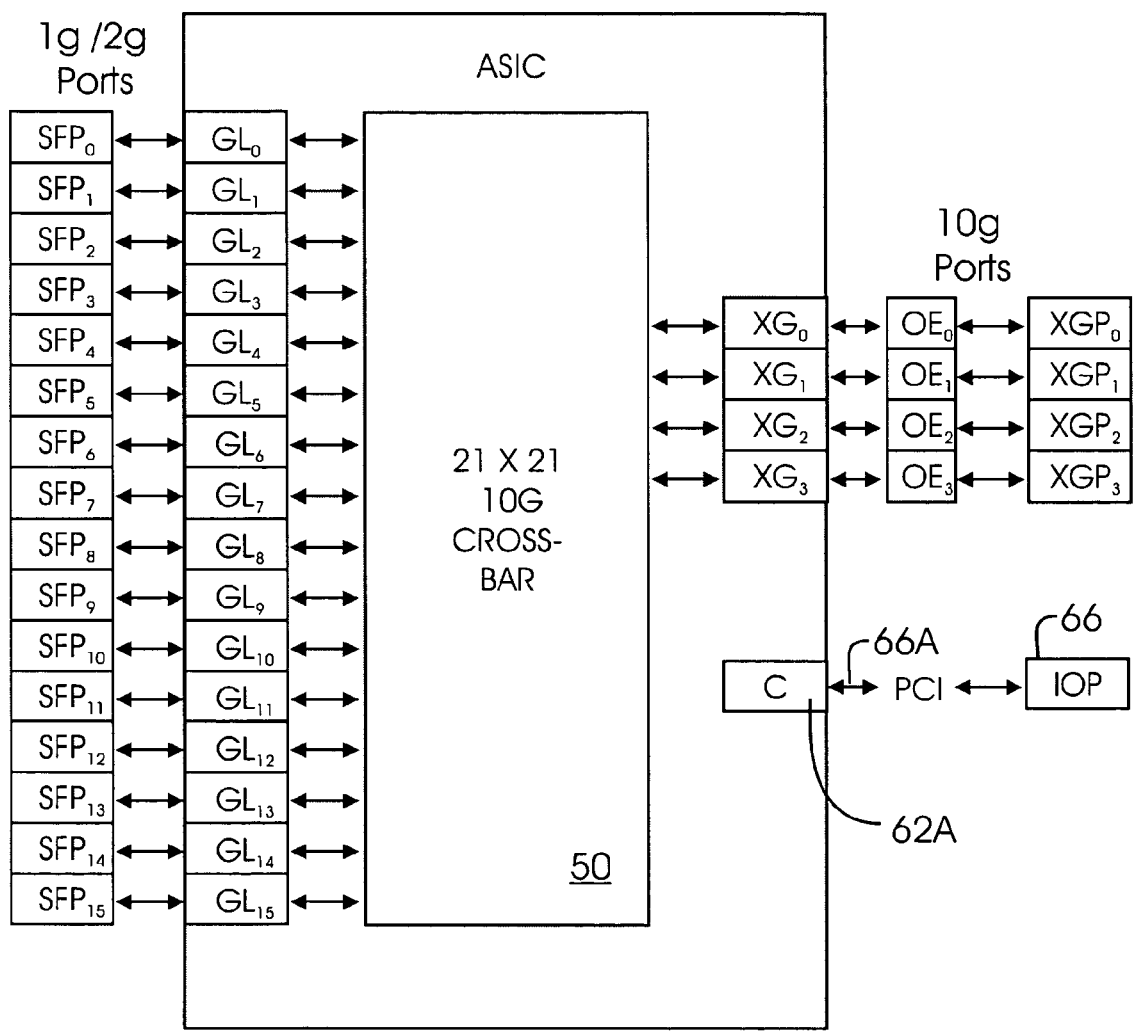

FIG. 1D shows a block diagram of ASIC 20 with sixteen GL_Ports designated as GL0-GL15 and four 10G port control modules designated as XG0-XG3. ASIC 20 include a control port 62A that is coupled to IOP 66 through a PCI connection 66A.

Figure 2:
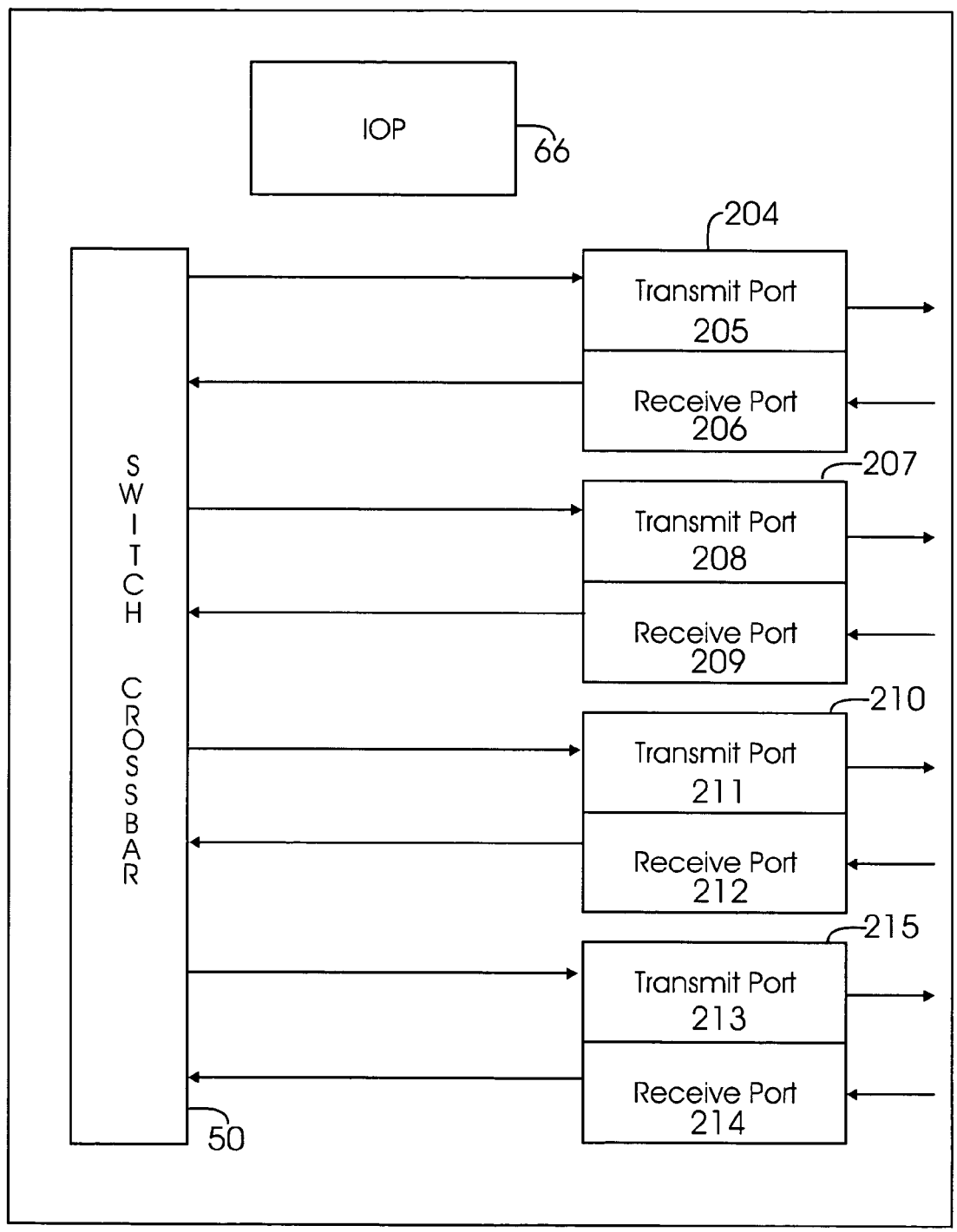
FIG. 2 is a block diagram of a switch chassis used according to one aspect of the present invention.

IOP 66 is also shown in FIG. 2 as a part of a switch chasis 201, containing switch ports 204, 207, 210 and 215. Each port as described above has a transmit port (segment), for example, 205, 208, 211 and 213, and receive port (segment), for example, 206, 209, 212 and 214.

Transmit ports and receive ports are connected by switch crossbar 50 so that they can transfer frames. IOP 66 controls and configures the switch ports.

In one aspect of the present invention, dividing frame traffic on ISLs into virtual lanes by assigning virtual lanes based on the number of hops to a destination switch, as described below reduces deadlock. Each virtual lane has its own buffer-to-buffer credit scheme. The term hop count means the number of ISLs a frame has to traverse before it reaches a destination switch.

To reduce and/or avoid deadlock in fibre channel switches, the following port requirements are used:

A receive port has receive buffers at least equal to the largest number of hops to a destination as seen by the transmit port of the switch that receives a frame. A receive buffer is also reserved for each hop count.

The hop count for frames can be derived from the data exchanged by switches using the standard FSPF protocol to set up routing within the Fabric, as described in the fibre channel standard, FC-SW-3, incorporated herein by reference in its entirety.

The transmit and receive ports assign a virtual lane to each hop count.

Each virtual lane is assigned some buffer-to-buffer credit. The total credit for all the virtual lanes is less than or equal to the total number of receive buffers available at a receive port.

Frames queued for transmissions are assigned a virtual lane and each hop count has a virtual lane.

Frames are transmitted if credit is available for its virtual lane.

Receive ports assign a virtual lane for the received frames. In one example, virtual lanes are assigned based on the hop count to a destination switch. If the destination is within the switch that received the frame, then the hop count is 0.

When a receive port empties a receive buffer, making it available for another frame, it sends a VC_RDY (n) primitive to the other end of the link. The VC_RDY contains the number of the virtual lane of the frame just processed. The fibre channel standard, FC-FS (incorporated herein by reference in its entirety) describes the VC_RDY primitive signal.

Using virtual lanes as discussed above, keeps the receive buffers of an ISL from filling up with frames for the same destination and provides receive buffers space for frames to other destination.

The following sequence shows how frames are delivered, using one aspect of the present invention:

Frames arriving on an ISL addressed to a particular switch can empty its receive buffers for virtual lane 0 and return VC_RDY (0) to the sender.

A switch that is 1 hop away from a destination switch (for example, switch 2 if the destination switch is switch 3 for a frame sent from switch 1) gets VC_RDY (0). In this example, this will allow switch 2 to empty the receive buffer for frames received from other switches.

During the exchange of ELP messages (fibre channel standard log-in messages) to log in the ISL ports (per FC-SW-3 standard, incorporated herein by reference in its entirety) virtual lanes and hop counts in the ELP messages can be used for flow control. If both ends of the ISL agree, the virtual lane flow control option is used. Since the virtual lane assignment is derived from the hop count, there is no need to negotiate virtual lane assignments.

If the receive port on an ISL receives a frame that it cannot route, it returns a VC_RDY (255) to the sender after the receive buffer is emptied. If a VC_RDY (255) is received, the credit is allocated to the lowest numbered virtual lane that does not have maximum transmit credit available. If any VC_RDY(n) is received where virtual lane n does not exist or is already at maximum transmit credit, the credit is allocated the same way.

Figure 3:
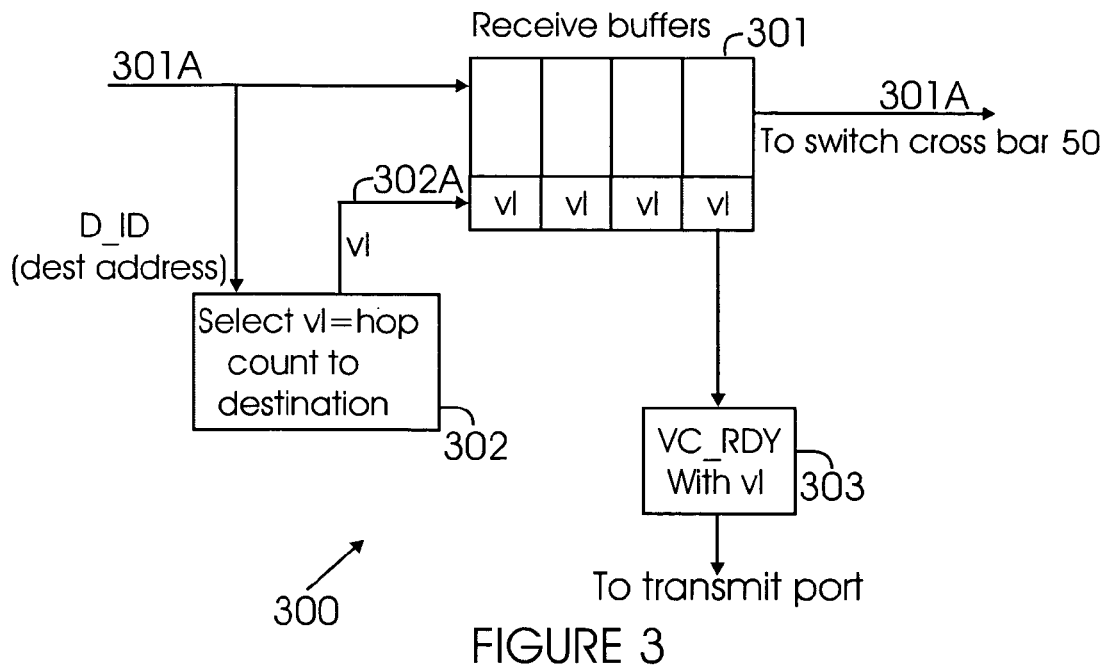
FIG. 3 shows a block diagram of a system in a receive port for assigning virtual lanes based on hop count, according to one aspect of the present invention.

FIG. 3 shows how received frames are processed using Virtual Lanes, according to one aspect of the present invention. The Fibre Channel header D_ID field 301A and a look-up table in logic 302 is used to look up the hop count for a frame based on the destination. The hop count number is used to assign a Virtual Lane (302A). The look-up table in logic 302 is loaded with data derived from the standard "FSPF" routing algorithm to determine the hop count. The frame and the assigned Virtual Lane 302A are stored in receive buffers 301.

When a frame (301A) is moved out of a receive buffer to a transmit port, receive buffer 301 sends a signal 303 to the transmit port. If the port is an ISL using the deadlock prevention process of the present invention, the flow control signal 303 is a VC_RDY primitive containing the assigned virtual lane (302A) when the frame was received.

Figure 4:
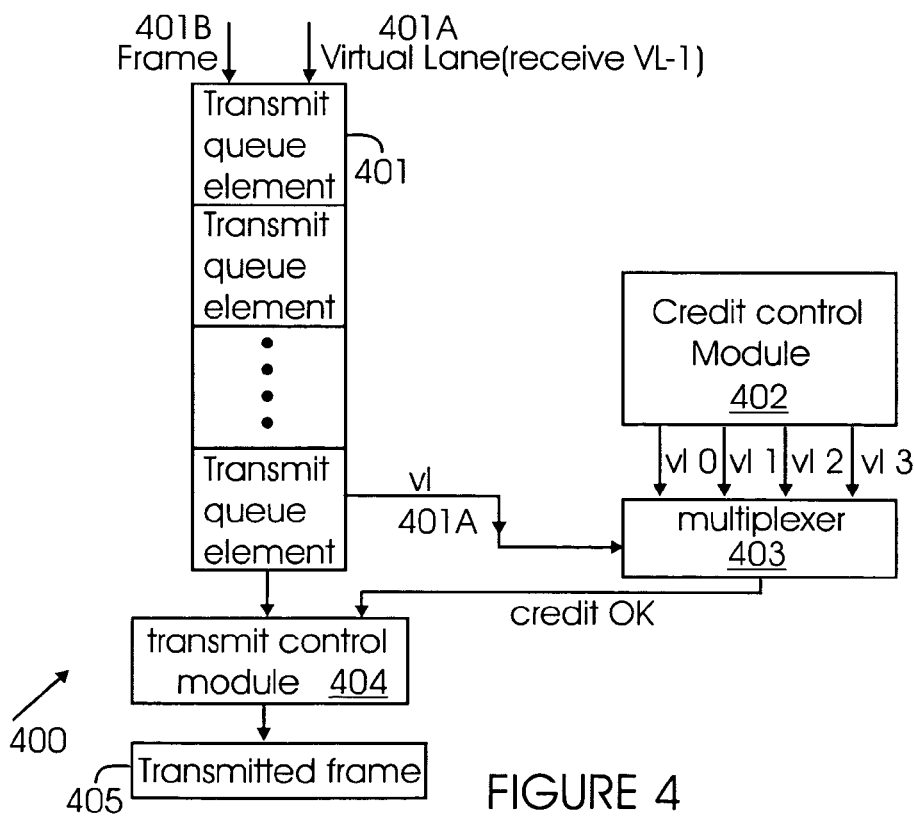
FIG. 4 is a block diagram showing a system in a transmit port for using virtual lanes based on hop count, according to one aspect of the present invention.

FIG. 4 shows a block diagram of logic 400 used in flow control for a transmit port using virtual Lanes (in this example, 4 virtual lanes) for reducing and/or avoiding deadlocks, according to one aspect of the present invention. Logic 400 can be used for ISLs (E-ports) that connect switches. Frames are queued in queue 401 and are assigned a Virtual Lane (401A).

In one aspect of the present invention, the assigned Virtual Lane 401A is one less than the Virtual Lane assigned by the receive port (303, FIG. 3). The assigned Virtual Lane 401A is used by multiplexer 403 to determine which credit control output from credit control module 402 is used to determine if a frame has available credit for transmission. Transmit control module 404 determines if a frame is available for transmission and credit is available. If a frame and credit is available, then frame 405 is transmitted to its destination.

Figure 5:
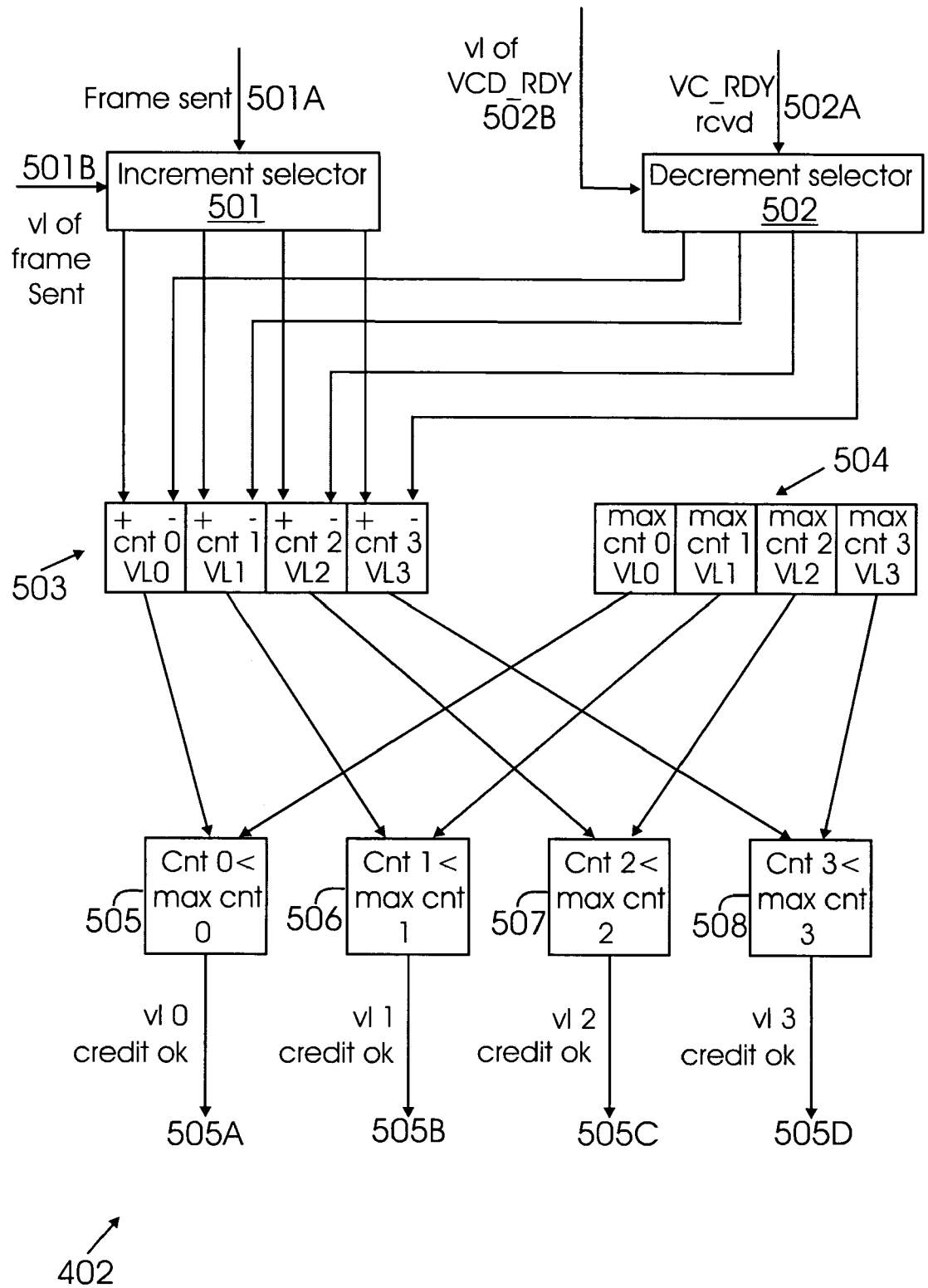
FIG. 5 is a block diagram of a credit control module, used according to one aspect of the present invention.
Figure 6:
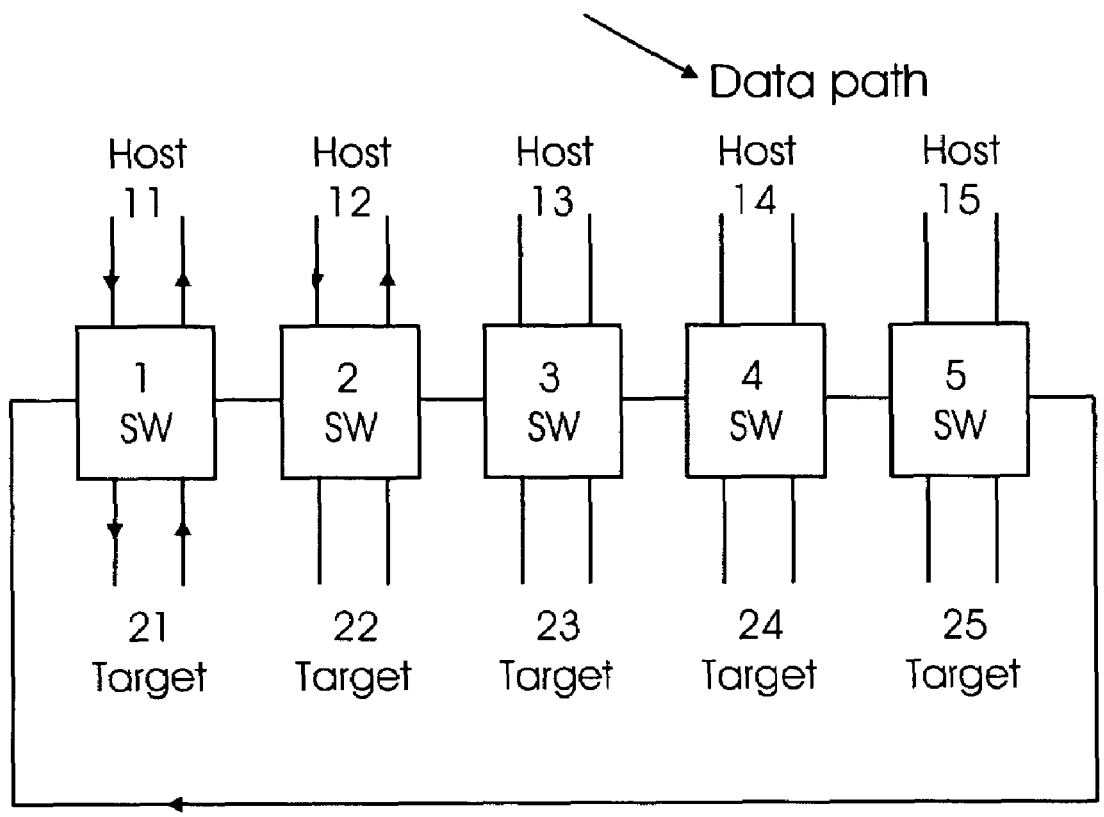
FIG. 6 shows a block diagram for illustrating deadlock in a fibre channel fabric.

FIG. 5 shows a block diagram of credit control module 402, according to one aspect of the present invention. Credit control module 402 has an increment selector 501 and decrement selector 502 for increasing and decreasing counters 503. Counter 503 maintains count for each virtual lane, for example, VL0, VL1, VL2 and VL3. Selector 501 increments a virtual lane credit count based on 501B, i.e., the VL of a frame that is transmitted. Selector 501 also receives input 501A from transmit control module 404 which indicates when a frame has been sent.

If a VC_RDY 502A is received from a receive buffer, then selector 502 decrements the value of the appropriate counter 503. Selector 502 also receives the Virtual Lane associated with the VC_RDY (502) from the receive buffer (similar to 303, FIG. 3).

Counter(s) 503 maintain(s) count for the virtual lanes VL0, VL1, VL2 and VL3. In one aspect of the present invention, each virtual lane may have a pre-programmed maximum count value that is stored in counters 504.

Logic (also referred to as "compare module") 505 compares the maximum count value for virtual lane 0 to determine if credit is available on virtual lane 0. Logic 506-508 performs the same function for virtual lanes 1, 2 and 3, respectively. Compare modules 505-508 generate signals 505A-505D indicating if credit is available for a particular Virtual Lane to transmit a frame.

To illustrate the adaptive aspects of the present invention separate counters have been shown, however, the present invention is not limited to any particular number of counters.

For example, logic with a single counter may be used to compare the maximum count (504) and the count (503) for each lane.

In another aspect of this invention, other queuing methods could be used instead of the one described for this embodiment. For instance, a transmit port may have a transmit queue for each Virtual Lane, and/or for each receive port.

Figure 7:
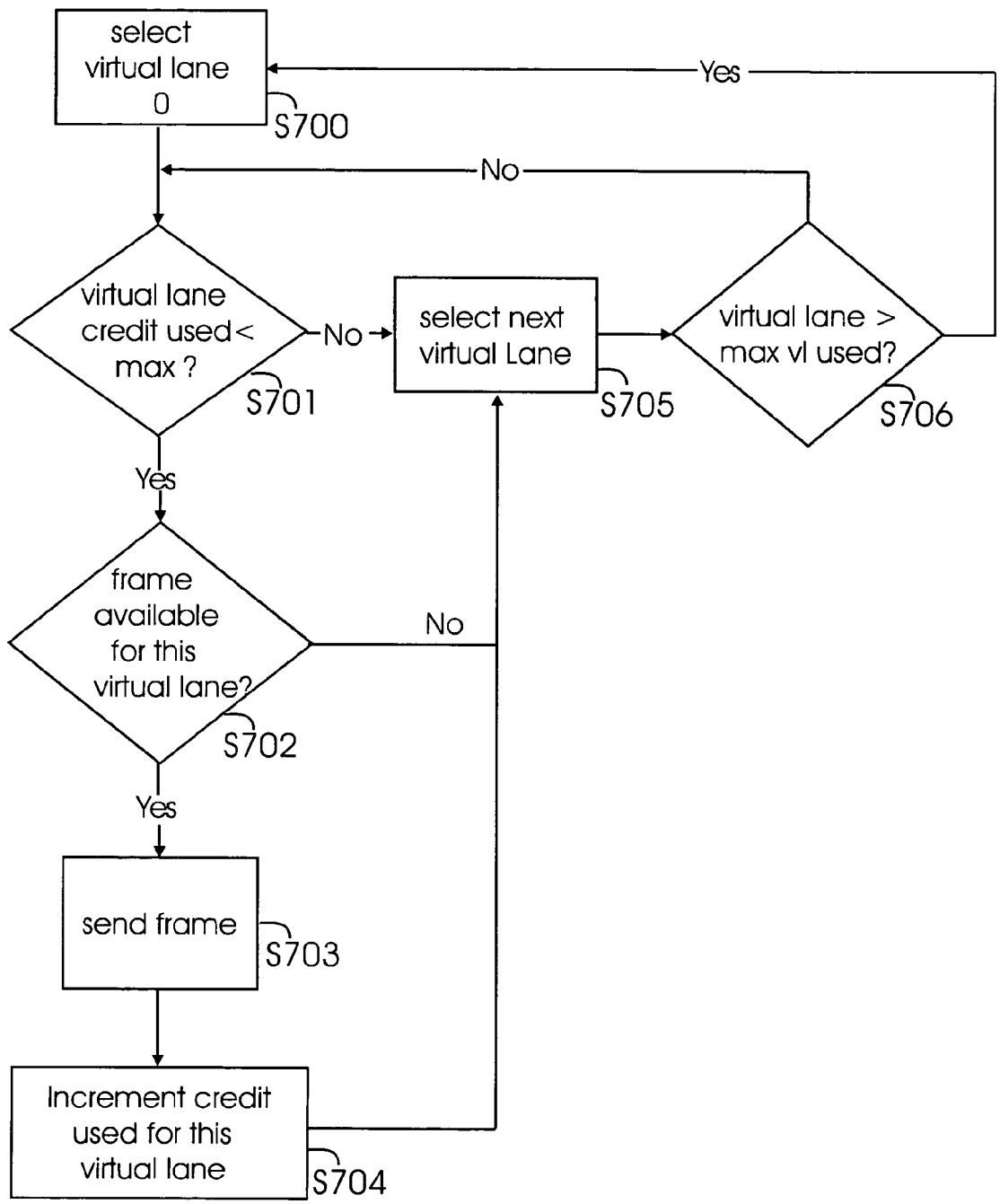
FIG. 7 is a flow diagram for using virtual lanes, according to one aspect of the present invention.

FIG. 7 shows a process flow diagram, according to one aspect of the present invention using virtual lanes for frame transmission.

In step S700, the process selects a particular virtual lane, for example, virtual lane 0. In step S701, the process determines if the credit used for a particular virtual lane (for example, virtual lane 0) is less than a maximum programmed amount or a particular value (FIG. 5, 504). This is performed by logic 505-508, depending upon which lane is selected. In the foregoing example, for VL0, it is logic 505. If virtual lane credit exceeds the maximum count, then in step S705, the process selects the next available virtual lane (for example, virtual lane 1). In step S706, the process determines if the selected virtual lane has used it's maximum credit. If yes, the process reverts back to step S700, otherwise the process moves to step S701.

In step S702, the process determines if a frame is available for the selected virtual lane (i.e. the lane that is selected in step S701 or S706). If a frame is not available, the process moves to step S705.

If a frame is available in step S702, the frame is sent in step S703 (for example, 505A), and then in step S704, the credit counter for the virtual lane is incremented by selector 501 using one of the counters 503.

Figure 8:
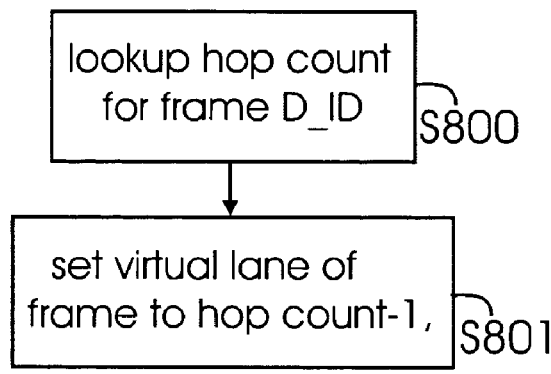
FIG. 8 is a flow diagram for transmitting frames using virtual lane assignment, according to one aspect of the present invention.

FIG. 8 provides a flow diagram for selecting a virtual lane, according to one aspect of the present invention. In step S800, the process determines the hop count for a frame's D_ID. In step S801, the process sets the virtual lane of a frame (401A). In one example, the virtual lane is one less than the hop count.

Figure 9:
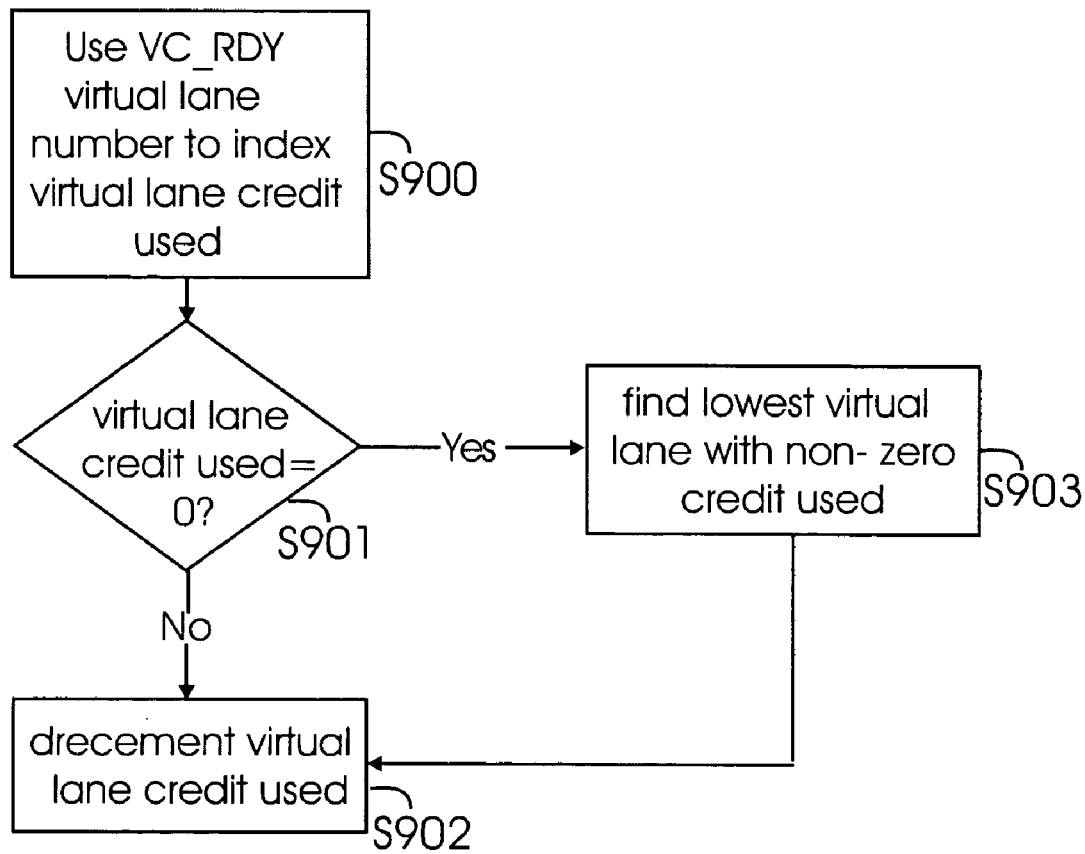
FIG. 9 is a flow diagram for VC_RDY processing, according to one aspect of the present invention.

FIG. 9 shows a flow diagram for processing VC_RDY primitives, according to one aspect of the present invention. In step S900, the process uses a VC_RDY virtual lane number to index virtual lane credit that has been used for a particular frame. This information comes as 502B to selector 502 from the receive port.

In step S901, the process determines if all the credit for a particular virtual lane has been used. If yes, then in step S903, the process finds the next virtual lane with non-zero credit.

If in step S901, virtual lane credit is not equal to zero, then in step S902, selector 502 decrements the virtual lane credit value that has been used.

Figure 10:
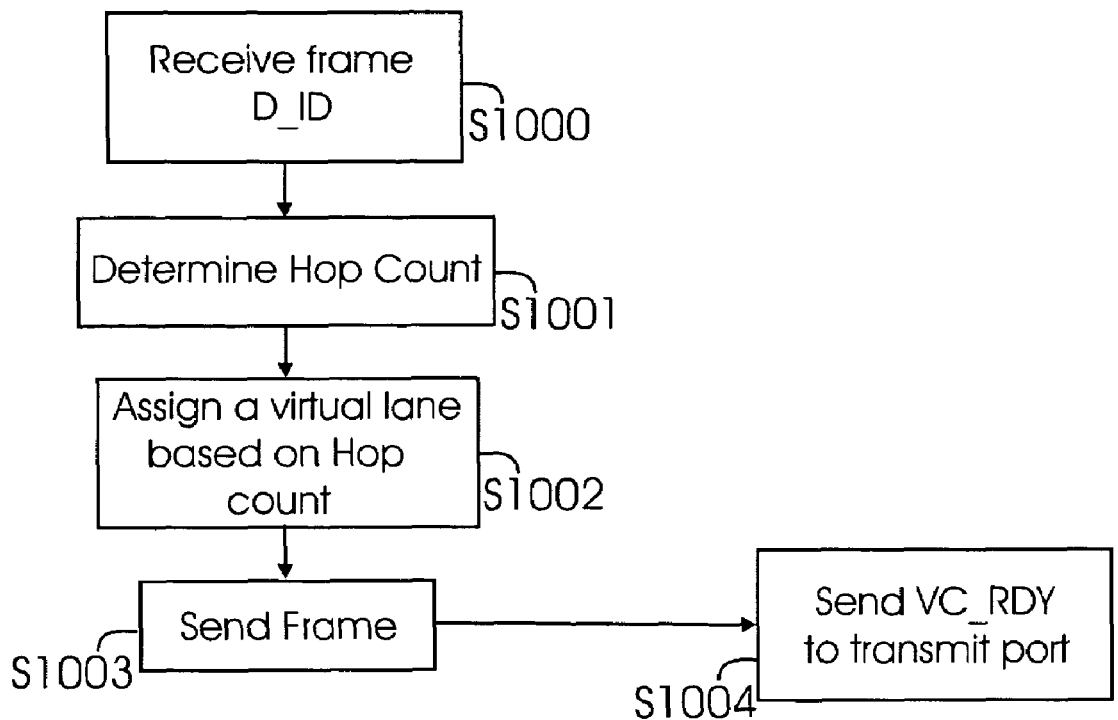
FIG. 10 is a flow diagram for processing frames at a receive port, according to one aspect of the present invention.

FIG. 10 shows a flow diagram for processing frame in the receive port of a switch, according to one aspect of the present invention. In step S1000, the process receives frame D-ID 301A. In step S1001, the process determines the hop count for the frame. This can be obtained by using the standard FSPF algorithm.

In step S1002, the process assigns a virtual lane based on the hop count. If the frame is destined for the same switch, the virtual lane is zero.

In step S1003, the receive port sends the frame to the transmit segment and in step S1004, a VC_RDY primitive is sent to the transmit port with the VL assignment value (502B).

Figure 11:
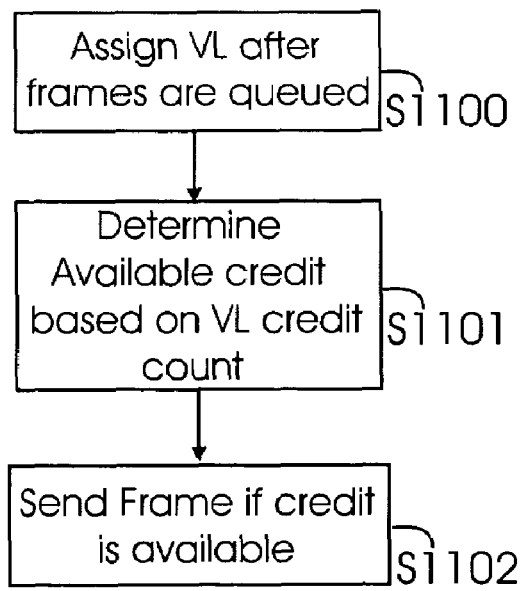
FIG. 11 is a flow diagram for handling frames in a transmit port, according to one aspect of the present invention.

FIG. 11 is an overall process flow diagram for sending frames from the transmit port of a switch. In step 1100, the process assigns a virtual lane for a frame that is queued (401A).

In step S1101, the process determines if credit is available for a particular virtual lane. This is performed by credit control module 402, as described above.

In step S1102, a frame is sent if credit is available.

In one aspect, the present invention reduces/prevents the deadlock by separating frames queued for transmission into virtual lanes, each with its own transmit queue and flow control. Flow control uses the Fibre Channel VC_RDY primitive signal to give separate flow control signals to each virtual lane. Also, no frames are discarded to reduce/avoid deadlock.

Although the present invention has been described with reference to specific embodiments, these embodiments are illustrative only and not limiting. Many other applications and embodiments of the present invention will be apparent in light of this disclosure and the following claims.

What is claimed is:

1. A method for processing fibre channel frames, comprising:
    (a) providing a plurality of virtual lanes to a fibre channel switch element having a plurality of ports, each of the virtual lane configured to transmit one or more frames between a source and a destination;
    (b) receiving a fibre channel frame at a receive segment of one of the plurality of ports of the fibre channel switch element;
    (c) determining a hop count for the frame based on a destination identifier value (D_ID) included in a header of the fibre channel frame at the receive segment, with a hop count value indicative of a frame destined for another port of the fibre channel switch element;
    (d) assigning a virtual lane for the frame based on the determined hop count at the receive segment;
    (e) modifying the assigned virtual lane at the transmit segment of one of the plurality of ports of the fibre channel switch element if the assigned virtual lane by the receive segment is not indicative of a frame destined for another port of the fibre channel switch element, and if the assigned virtual lane is indicative of a frame destined for another port of the fibre channel switch element, no virtual lane is assigned to the frame at the transmit segment;
    (e) determining if the assigned virtual lane at the transmit segment has available credit to transmit the fibre channel frame; and
    (f) transmitting the fibre channel frame using the assigned virtual lane at the transmit segment, if credit is available.

2. The method of claim 1, further comprising:
    incrementing a counter value for counting available credit for the assigned virtual lane at the transmit segment, if the fibre channel frame is sent using the assigned virtual lane.

3. The method of claim 1, wherein the assigned virtual lane at the transmit segment has a programmed maximum credit count.

4. The method of claim 1, wherein if all credit for the assigned virtual lane at the transmit segment has been used, then a next virtual lane is selected with non-zero credit.

5. A method for processing fibre channel frames using a fibre channel switch element having a plurality of ports, each port having a receive segment and a transmit segment, comprising:
    (a) providing a plurality of virtual lanes to the fibre channel switch element, each of the virtual lanes configured to transmit one or more fibre channel frames between a source and a destination;
    (b) receiving a fibre channel frame at a receive segment of one of the plurality of ports of the fibre channel switch element;
    (c) determining a hop count for the fibre channel frame at the receive segment, based on a destination identifier value (D_ID) included in a header of the fibre channel frame, with a hop count value indicative of a frame destined for another port of the fibre channel switch element;

(d) assigning a virtual lane to the received fibre channel frame at the receive segment, based on the determined hop count for the frame;

(e) sending a primitive to a transmit segment with the assigned virtual lane to transmit the fibre channel frame to a destination; and (f) modifying the assigned virtual lane at the transmit segment if the assigned virtual lane by the receive segment is not indicative of a frame destined for another port of the fibre channel switch element, and if the assigned virtual lane is indicative of frame destined for another port of the fibre channel switch element, no virtual lane is assigned at the transmit segment.

6. The method of claim 5, further comprising:

determining if credit is available for the assigned virtual lane at the transmit segment to send the fibre channel frame using the assigned virtual lane.

7. The method of claim 6, wherein a credit count for the assigned virtual lane is maintained by a counter and the assigned virtual lane has a maximum credit count.

8. The method of claim 5, wherein a counter value is decremented after the primitive is received by the transmit segment.

9. The method of claim 6, wherein the assigned virtual lane value at the transmit segment is less than the assigned virtual lane in the receive segment.

10. A system for processing fibre channel frames, comprising:

a fibre channel switch element having a plurality of ports, wherein each port includes a receive segment for receiving fibre channel frames and a transmit segment for transmitting fibre channel frames;

a plurality of virtual lanes for the fibre channel switch element, each of the plurality of virtual lanes configured to transmit one or more fibre channel frames between a source and a destination; and a look up table to assign a virtual lane to a fibre channel frame received at the receive segment of a port from among the plurality of ports; wherein the virtual lane is assigned based on a hop count, and the hop count is based on a destination identifier value (D_ID) included in a header of the received fibre channel frame, with a hop count value indicative of a frame destined for another port of the fibre channel switch element;

wherein after the virtual lane is assigned based on the hop count value by the receive segment, the receive segment sends a primitive to a transmit segment, the primitive including information regarding the assigned virtual lane;

wherein the transmit segment modifies the assigned virtual lane so as to assign a virtual lane to fibre channel frame if the assigned virtual lane is different than the value indicative of a frame destined for another port of the fibre channel switch element, and if the assigned virtual lane is indicative of a frame destined for another port of the fibre channel switch element, no virtual lane is assigned at the transmit segment; and wherein the transmit segment includes a credit control module that determines if the assigned virtual lane can transmit a frame based on available credit.

11. The system of claim 10, wherein the credit control module increments a credit count for the assigned virtual lane if the fibre channel frame is transmitted from the assigned virtual lane.

12. The system of claim 10, wherein the credit control module decrements a credit count for the assigned virtual lane if a VC_RDY primitive is received.

13. The system of claim 10, wherein the credit control module maintains a maximum count for every virtual lane used for transmitting frames.

14. The system of claim 11, wherein the credit control module uses an increment selector to increment credit count.

15. The system of claim 12, wherein the credit control module uses a decrement selector to decrease the credit count.

16. The system of claim 10, wherein the credit control module uses compare logic to compare available credit for the assigned virtual lane at any given time with a programmed maximum credit value for the assigned virtual lane.

17. A fibre channel fabric switch element for processing fibre channel frames, comprising:

a plurality of ports for receiving and transmitting fibre channel frames, wherein each port includes a receive segment for receiving fibre channel frames and a transmit segment for transmitting fibre channel frames;

a plurality of virtual lanes for the fibre channel switch element, each of the plurality of virtual lanes configured to transmit one or more fibre channel frames between a source and a destination; and a look up table to assign a virtual lane to a fibre channel frame received at the receive segment of a port from among the plurality of ports; wherein the virtual lane is assigned based on a hop count, the hop count is based on a destination identifier value (D_ID) included in a header of the received fibre channel frame, with a hop count value indicative of a frame destined for another port of the fibre channel switch element;

wherein after the virtual lane is assigned based on the hop count, the receive segment sends a primitive to a transmit segment, the primitive including information regarding the assigned virtual lane;

wherein the transmit segment modifies the assigned virtual lane so as to assign a virtual lane to fibre channel frame if the hop count value is different than the value indicative of a frame destined for another port of the fibre channel switch element, and if the assigned virtual lane is indicative of a frame destined for another port of the fibre channel switch element, no virtual lane is assigned at the transmit segment; and wherein the transmit segment includes a credit control module that determines if the assigned virtual lane can transmit a frame based on available credit.

18. The switch element of claim 17, wherein the credit control module increments a credit count for the assigned virtual lane if the fibre channel frame is transmitted from the assigned virtual lane.

19. The switch element of claim 17, wherein the credit control module decrements a credit count for the assigned virtual lane if a VC_RDY primitive is received.

20. The switch element of claim 17, wherein the credit control module maintains a maximum count for every virtual lane used for transmitting frames.

21. The switch element of claim 18, wherein the credit control module uses an increment selector to increment credit count.

22. The switch element of claim 19, wherein the credit control module uses a decrement selector to decrease the credit count.

23. The switch element of claim 17, wherein the credit control module uses compare logic to compare available credit for the assigned virtual lane at any given time with a programmed maximum credit value for the assigned virtual lane.

24. The method of claim 1, wherein the hop count value indicative of a frame destined for another port of the fibre channel switch element is zero.

25. The method of claim 5, wherein the hop count value indicative of a frame destined for another port of the fibre channel switch element is zero.

26. The system of claim 10, wherein the hop count value indicative of a frame destined for another port of the fibre channel switch element is zero.

27. The switch element of claim 17, wherein the hop count value indicative of a frame destined for another port of the fibre channel switch clement is zero.

* * * * *

UNITED STATES PATENT AND TRADEMARK OFFICE
CERTIFICATE OF CORRECTION

PATENT NO. : 7,564,789 B2  Page 1 of 1
APPLICATION NO. : 10/798468
DATED : July 21, 2009
INVENTOR(S) : Steven M. Betker It is certified that error appears in the above-identified patent and that said Letters Patent is hereby corrected as shown below:

On page 5, in column 1, under "Other Publications", line 19, delete "Melham," and insert -- Melhem, --, therefor.

On sheet 6 of 10, in FIG. 5, Reference Numeral 502B, line 2, delete "VCD_RDY" and insert -- VC_RDY --, therefor.

In column 2, line 4, delete "1508D" and insert -- 1508D. --, therefor.

In column 2, line 24, delete "22" and insert -- 22. --, therefor.

In column 6, line 29, delete "chasis" and insert -- chassis --, therefor.

In column 6, line 65, delete "chasis" and insert -- chassis --, therefor.

In column 10, line 39, in claim 1, delete "(e)" and insert -- (f) --, therefor.

In column 10, line 42, in claim 1, delete "(f)" and insert -- (g) --, therefor.

In column 11, line 15, in claim 5, after "of" insert -- a --.

In column 11, line 16, in claim 5, delete "element ," and insert -- element, --, therefor.

In column 14, line 9, in claim 27, delete "clement" and insert -- element --, therefor.

Signed and Sealed this

Second Day of November, 2010

David J. Kappos
*Director of the United States Patent and Trademark Office*